Jan. 8, 1924.  1,480,192
C. C. WORSFOLD
BOWLDER DREDGE
Filed April 20, 1923  2 Sheets-Sheet 1
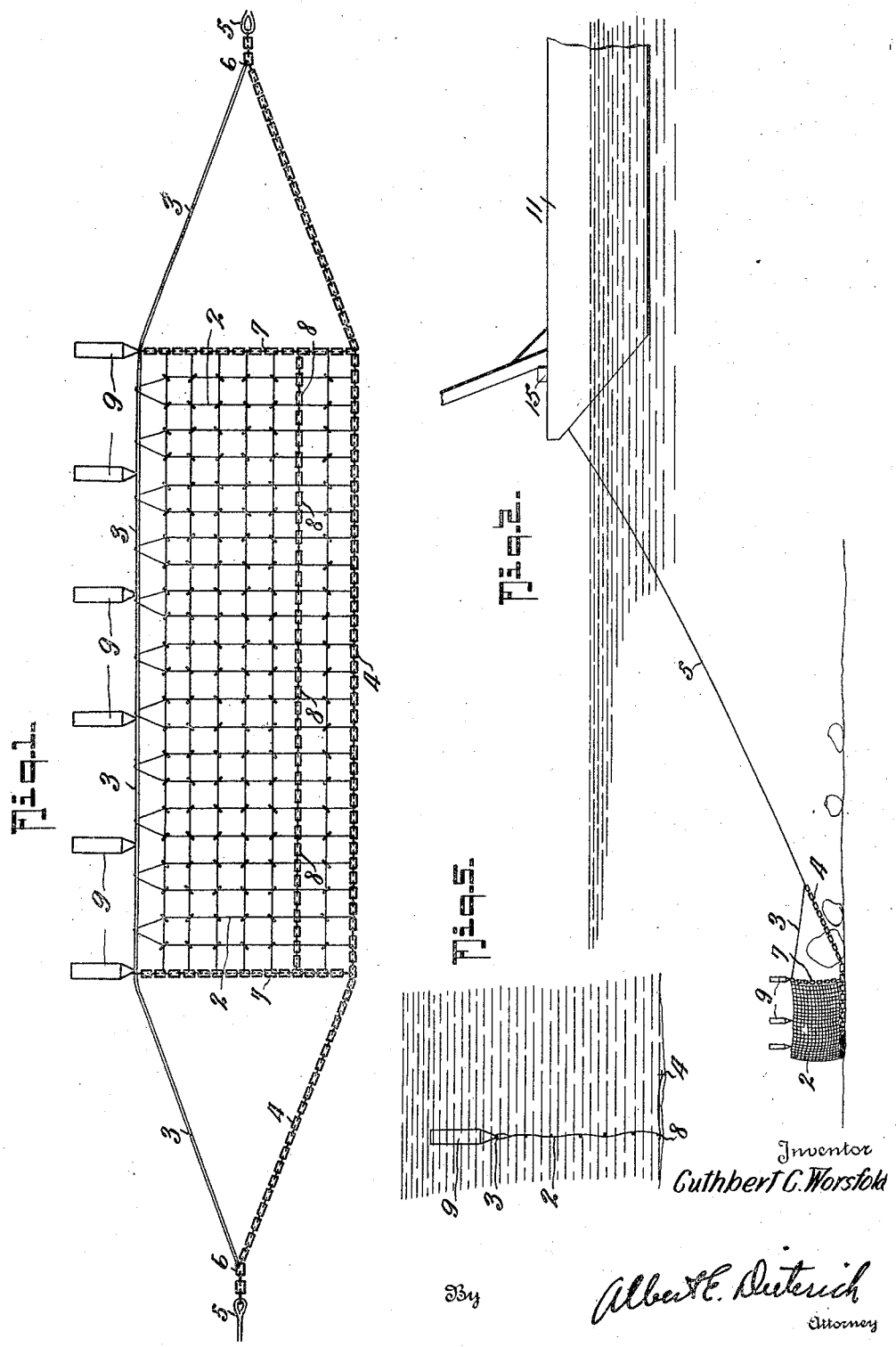
Inventor
Cuthbert C. Worsfold
By Albert E. Dieterich
Attorney Jan. 8, 1924. 1,480,192
C. C. WORSFOLD
BOWLDER DREDGE
Filed April 20, 1923 2 Sheets-Sheet 2
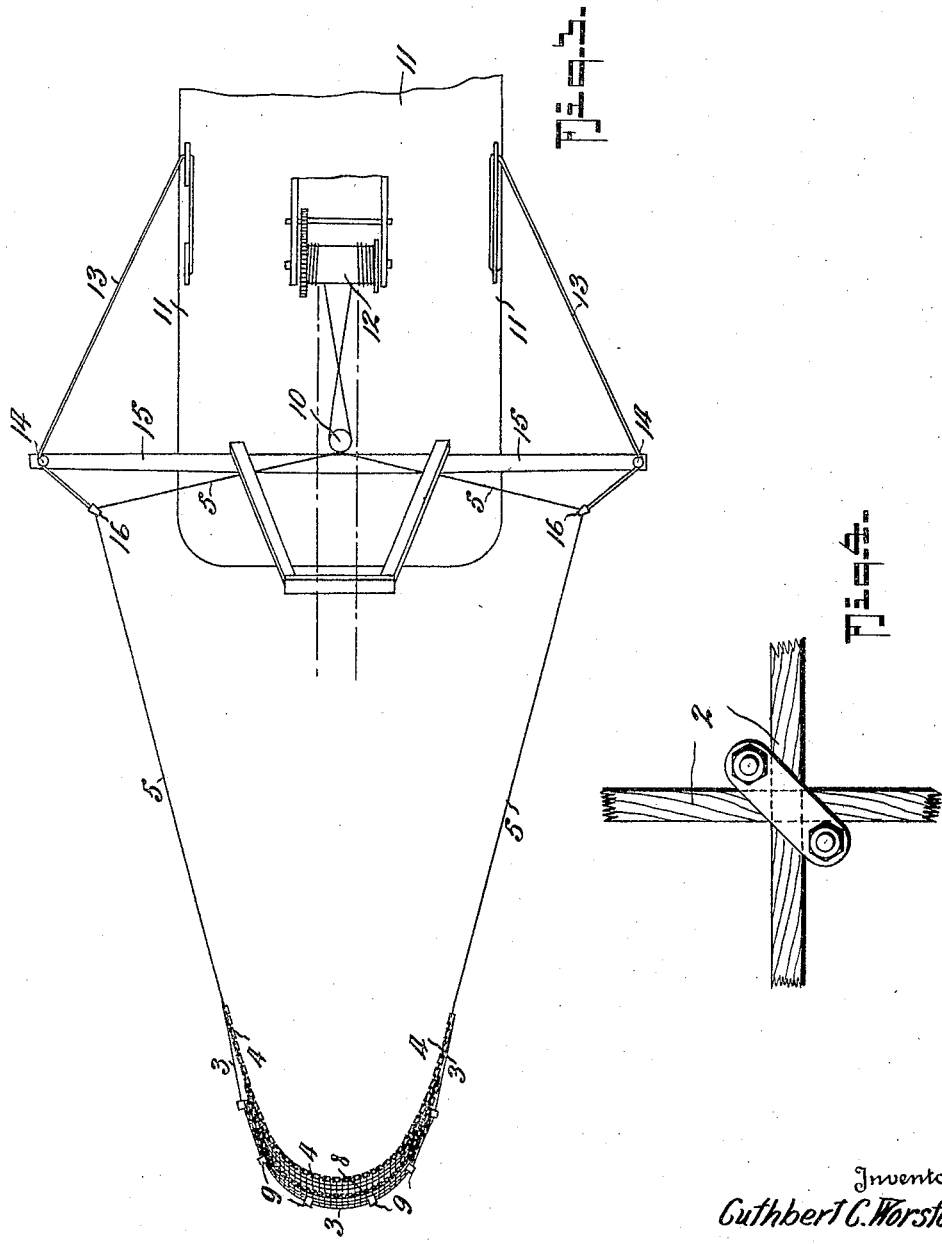
Inventor
Cuthbert C. Worsfold.
By Albert E. Dieterich
Attorney Patented Jan. 8, 1924.

1,480,192

UNITED STATES PATENT OFFICE.

CUTHBERT C. WORSFOLD, OF NEW WESTMINSTER, BRITISH COLUMBIA, CANADA.

BOWLDER DREDGE.

Application filed April 20, 1923. Serial No. 633,476.

*To all whom it may concern:*

Be it known that I, CUTHBERT C. WORSFOLD, citizen of the Dominion of Canada, residing at New Westminster, in the Province of British Columbia, Canada, have invented certain new and useful Improvements in Bowlder Dredges, of which the following is a specification.

This invention relates to a means for dredging rocks or bowlders from below water in rivers, or tidal channels.

The removal of such bowlders from the bottom of a channel being dredged has always been a matter of considerable difficulty and expense, as it is usually necessary for a diver to go down and make fast the lifting tackle, and where, as is frequently the case, there is a strong current, tidal or otherwise, the difficulty is much increased.

In the invention, which is the subject of this application, the work is effected by a strong net of wire rope and chain, the ends of which are connected to the dredging vessel, and the construction of the net and the manner of its connection to the dredging vessel are such that while the greater part of the net is buoyed to assume an upright position, the lower edge of its lies along the bottom of the channel and slightly in advance of the upright portion.

Thus, when the leading edge encounters a bowlder, the bowlder is dragged from its bed in the bottom of the channel and is retained in the net. The net, with its bowlder contents, can then be drawn up to and lifted aboard the vessel or the contents can be otherwise disposed of.

The invention is fully described in the following specification, reference being made to the drawings by which it is accompanied, in which:

Fig. 1 is a plan of the drag net and its connections.

Fig. 2, an elevation to a reduced scale showing the net as connected to the dredging vessel.

Fig. 3 is a plan of the same, and

Fig. 4 is an enlarged detail of its clamp connection of the warp and woof ropes of the net.

Fig. 5 is a vertical section through the net showing the disposition of the lower edge on the bottom of the channel.

The net 2, of suitable size with a length approximately four times its width, is constructed of galvanized steel wire rope, the crossing ropes being preferably connected together by clamps bolted diagonally across the intersections.

A relatively stronger wire rope 3 extends along one edge of the net, which, in use, is the upper edge, and a chain 4 along the opposite or lower edge, and the ends of the rope 3 and chain 4 are produced beyond each end of the net 2 to form a bridle by which the net is connected by a swivel 6 to the two hauling ropes 5.

A relatively lighter chain 7 is carried along each end of the net between the rope 3 and the chain 4, and between these end chains 7 a chain 8 is carried along the lower part of the net parallel to the chain 4 at approximately one-fourth of the width of the net from it. All these chains are interwoven or otherwise connected to the net. Floats 9 are connected to the wire rope 3 along the upper side of the net, the buoyancy of which floats is sufficient to sustain the greater part of the net in a substantially upright position when in the water.

The main hauling ropes 5 are passed around a bollard 10 on the end of the dredging vessel 11, preferably the bow, as being clear of the boat propelling means, and are connected to the drum 12 of a powerful winch that the two ropes may be wound simultaneously on the drum.

Adjacent the vessel the hauling ropes 5 are held apart by out-haul ropes 13, which pass around a snatch block 14 on each end of a transverse out-rigging spar 15, secured across the bow of the vessel and are connected at 16 to the hauling ropes 5 by a shackle or otherwise at a distance from the net, dependent on the depth of the water in which the net is being used.

So applied, owing largely to the angle of pull on the ropes 5, the lower part of the net 2 between the chains 4 and 8 lies on the bottom of the channel and in advance of the main body of the net, and the remainder of the net is sustained substantially upright by the floats 9 the chains 4 and 8 being flexible and free from any resilient resistance, lie close on the bottom of the channel, and as the vessel 11 is backed along the channel, the heavier chain 4, when it encounters a bowlder, drags it from its bed and either slips the net under it or rolls it into the net.

The out-haul ropes 13 are preferably of manila or other fibre so as to yield to some extent and break the shock of engagement with an exceptionally heavy bowlder.

When a sufficient load is in the net, the out-haul ropes 13 are released to enable the hauling ropes 5 to lead direct to the drum 12 of the winch, as indicated by the dotted lines in Fig. 3, and the load is drawn up to the vessel and either carried into shoal water or is lifted inboard.

The essential feature of the invention lies in the provision of the chain 4 along the lower edge of the net, and again in the chain 8 parallel and adjacent 4. These chains not only reinforce the lower edge of the net but provide a greater weight than wire ropes of equal strength would afford. Further, the extreme flexibility of the lower chain 4 enables it to lie close to the bottom and retain an effective hold of any bowlder it may encounter.

Having now particularly described my invention, I hereby declare that what I claim as new and desire to be protected in by Letters Patent is:

1. A means for dredging bowlders from below water, said means comprising a wire rope net, a relatively stronger wire rope connected to the net along one edge, a chain connected to the net along the other edge, the ends of which wire rope and chain are produced beyond the ends of the net and connected together and to hauling lines, and a series of floats connected to the wire rope along one edge of the net.

2. A means for dredging bowlders from below water, said means comprising a wire rope net, a relatively stronger wire rope connected to the net along one edge and extending beyond each end, a chain connected to the net along the other edge and extending beyond each end, means for connecting the ends of the wire rope and chain together and to hauling lines, a series of floats connected to the wire rope along one edge of the net and a chain extending lengthwise of the net parallel and adjacent the edge chain of the same.

3. A means for dredging bowlders from below water, said means comprising a wire rope net, a relatively stronger wire rope connected to the net along one edge and extending beyond each end, a chain connected to the net along the other edge and extending beyond each end, means for connecting each end of the wire rope to the corresponding end of the chain and each pair to a hauling line, chains connected along each end of the net between the wire rope of one edge and the chain of the other edge, and a chain extending lengthwise of the net between the two end chains, parallel and adjacent to the chained edge of the net.

In testimony whereof I affix my signature.

CUTHBERT C. WORSFOLD.